US011342823B2

(12) United States Patent
Yanagisawa et al.

(10) Patent No.: US 11,342,823 B2
(45) Date of Patent: May 24, 2022

(54) CLAMP JIG, STATOR MANUFACTURING DEVICE, AND METHOD FOR MANUFACTURING STATOR

(71) Applicant: HONDA MOTOR CO., LTD., Tokyo (JP)

(72) Inventors: Takeshi Yanagisawa, Tochigi (JP); Kazuhito Hiraga, Tochigi (JP); Hideaki Onda, Tochigi (JP); Kenichiro Murata, Tochigi (JP); Akifumi Sudo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 16/083,569

(22) PCT Filed: Mar. 17, 2017

(86) PCT No.: PCT/JP2017/010994
§ 371 (c)(1),
(2) Date: Sep. 10, 2018

(87) PCT Pub. No.: WO2017/159865
PCT Pub. Date: Sep. 21, 2017

(65) Prior Publication Data
US 2019/0081539 A1    Mar. 14, 2019

(30) Foreign Application Priority Data
Mar. 17, 2016 (JP) .............................. JP2016-054460

(51) Int. Cl.
*H02K 15/04*    (2006.01)
*H02K 3/50*    (2006.01)
(Continued)

(52) U.S. Cl.
CPC .......... *H02K 15/0485* (2013.01); *H02K 3/04* (2013.01); *H02K 3/28* (2013.01); *H02K 3/50* (2013.01);
(Continued)

(58) Field of Classification Search
CPC .............. H02K 15/04; H02K 15/0056; H02K 15/0081; H02K 15/0435; H02K 15/0442;
(Continued)

(56) References Cited

U.S. PATENT DOCUMENTS 6,501,206 B2 * 12/2002 Oohashi ................... H02K 3/28
310/180
6,903,478 B2 * 6/2005 Dobashi ................... H02K 3/12
310/179
(Continued)

FOREIGN PATENT DOCUMENTS

JP    2004032964 A  *  1/2004
JP    2005-224028        8/2005
(Continued)

OTHER PUBLICATIONS

Notch, (n.d.) Collins English Dictionary—Complete and Unabridged, 12th Edition 2014. (1991, 1994, 1998, 2000, 2003, 2006, 2007, 2009, 2011, 2014). Retrieved May 6, 2020 from https://www.thefreedictionary.com/notch (Year: 2014).*
(Continued)

*Primary Examiner* — Gregory D Swiatocha
*Assistant Examiner* — Bobby Yeonjin Kim
(74) *Attorney, Agent, or Firm* — Rankin, Hill & Clark LLP

(57) ABSTRACT

Provided are a clamp jig for inhibiting an increase in the size of clamping equipment, and reducing the load during clamping by clamping after doing preliminary aligning of a segment end part; a stator manufacturing device; and a
(Continued)

method for manufacturing a stator. The clamp jig 40 has a pair of clamp bodies 41, extended in a stator core radial direction, for clamping from both sides in the stator core circumferential direction the end part of an electric conductor, which is inserted in the stator core and welded; and a convex part 42 provided extending in the stator core axis direction at the bottom of the clamp body 41, the convex part being inserted between unwelded electric conductors.

6 Claims, 7 Drawing Sheets

(51) Int. Cl.
*H02K 15/085* (2006.01)
*H02K 3/04* (2006.01)
*H02K 15/00* (2006.01)
*H02K 3/28* (2006.01)

(52) U.S. Cl.
CPC ......... *H02K 15/0081* (2013.01); *H02K 15/04* (2013.01); *H02K 15/085* (2013.01)

(58) Field of Classification Search
CPC ........... H02K 15/0464; H02K 15/0471; H02K 15/0478; H02K 15/0485; H02K 15/08; H02K 15/085; B25B 5/00; B25B 5/04; B25B 5/14; B25B 7/00; Y10T 29/53143; Y10T 29/53243
USPC ................................... 140/92.1; 269/3, 6, 95
See application file for complete search history.

(56) References Cited

U.S. PATENT DOCUMENTS

| | | | | |
|---|---|---|---|---|
| 6,990,724 B2* | 1/2006 | Tamura | .............. | H02K 15/0056 29/596 |
| 7,086,136 B2* | 8/2006 | Gorohata | ................. | H02K 3/12 219/125.11 |
| 8,584,346 B2* | 11/2013 | Berger | ............... | H02K 15/0081 29/596 |
| 9,757,820 B2* | 9/2017 | De Souza | .......... | B23K 37/0435 |
| 2003/0024101 A1* | 2/2003 | Tokizawa | ........... | H02K 15/0056 29/596 |
| 2006/0141874 A1* | 6/2006 | Lenoir | ............... | H02K 15/0081 439/874 |

FOREIGN PATENT DOCUMENTS

| | | | | | |
|---|---|---|---|---|---|
| JP | 2005224028 A | * | 8/2005 | | |
| JP | 2008-148431 A | | 6/2008 | | |
| JP | 2014-107876 | | 6/2014 | | |
| JP | 2014107876 A | * | 6/2014 | | |
| JP | 2015035922 A | * | 2/2015 | ......... | H02K 15/0081 |
| JP | 2015-155106 A | | 8/2015 | | |
| JP | 2016-189657 | | 11/2016 | | |

OTHER PUBLICATIONS

International Search Report, dated Jun. 13, 2017 (dated Jun. 13, 2017), 1 page.
Japanese Office Action dated Oct. 1, 2019, 2, pages.

* cited by examiner

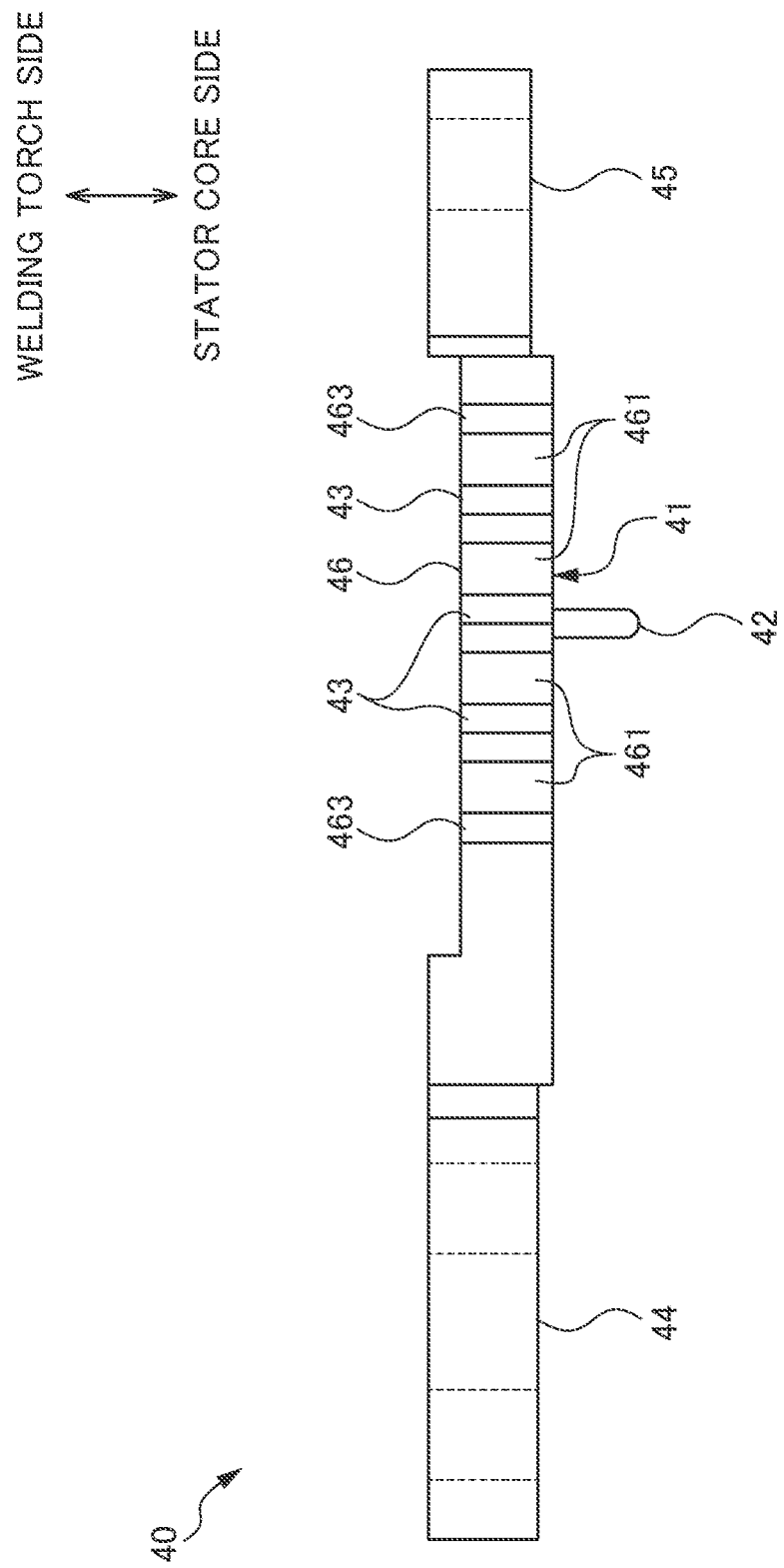

CLAMP JIG, STATOR MANUFACTURING DEVICE, AND METHOD FOR MANUFACTURING STATOR

TECHNICAL FIELD

The present invention relates to a clamp jig clamping an end part of a coil segment inserted in a stator core before welding, a stator manufacturing device, and a method for manufacturing a stator.

BACKGROUND ART

Conventionally, a motor in which a coil segment is inserted in a stator core is known as a motor mounted in an automobile, reduced in size, and increased in output. A stator of the motor is manufactured by end parts of the coil segment inserted in the stator core being clamped and welded two by two. Various clamp jigs are used for the clamping of the segment end parts (see, for example, Patent Document 1 and Patent Document 2).

Patent Document 1: Japanese Unexamined Patent Application, Publication No. 2014-107876

Patent Document 2: Japanese Unexamined Patent Application, Publication No. 2005-224028

DISCLOSURE OF THE INVENTION

Problems to be Solved by the Invention

In a case where the segment end parts are clamped and positioned before welding by means of the clamp jig disclosed in Patent Document 1 described above, a large load is applied to the clamp jig and the clamp jig is damaged.

A device that has the clamp jig disclosed in Patent Document 2 described above, which performs clamping by rotating two disk-shaped clamp plates, requires a process in which a claw is inserted from above between unwelded coils before the rotation of the two disk-shaped clamp plates and the claw part is removed after clamping. In addition, the device requires a claw member moving mechanism as well as a clamp mechanism, which entails an increase in equipment size.

An object of the present invention is to provide a clamp jig for inhibiting an increase in the size of clamping equipment and reducing the load during clamping by clamping after doing preliminary aligning of a segment end part, a stator manufacturing device, and a method for manufacturing a stator.

Means for Solving the Problems

In order to achieve the above object, the present invention provides a clamp jig (such as a clamp jig 40 to be described later) including a pair of clamp bodies (such as clamp bodies 41 to be described later), extended in a stator core (such as a stator core 21 to be described later) radial direction, for clamping from both sides in the stator core circumferential direction the end part (such as the end part 31 to be described later) of an electric conductor (such as a segment 30 to be described later), which is inserted in the stator core and welded and a convex part (such as a fin part 42 to be described later) provided extending in the stator core axis direction at the bottom of the clamp body, the convex part being inserted between unwelded electric conductors.

According to the present invention, when the clamp jig is disposed next to the electric conductor, the convex part is inserted between the electric conductors before sandwiching by the clamp jig. Then, the end part of the electric conductor is pressed in the stator core radial direction by the convex part, the end part of the electric conductor is moved, and the end part of the electric conductor is preliminarily aligned. As a result, a state can be achieved where the end parts of the electric conductor are easily accommodated in the end part accommodating recessed parts formed in the clamp body.

The preliminary aligning of the end part of the electric conductor is performed in advance before the sandwiching by the clamp jig as described above, and thus the load applied to the clamp jig when the segment is sandwiched by the clamp jig and when the clamp jig is moved in a state where the segment is sandwiched by the clamp jig is reduced. In addition, since the convex part is attached to the clamp jig, a separate preliminary aligning process for preliminarily aligning the end part of the electric conductor does not have to be provided and clamping can be performed with preliminary aligning during a series of clamping operations, and thus equipment costs can be reduced along with the cycle time for welding the end part of the electric conductor. In addition, collapsing of the electric conductor attributable to sandwiching by the clamp jig can be inhibited.

In addition, the present invention provides a stator manufacturing device (such as a welding device 10 to be described later) manufacturing a stator by welding an end part (such as an end part 31 to be described later) of an electric conductor (such as a segment 30 to be described later) inserted in a stator core (such as a stator core 21 to be described later), the stator manufacturing device including a pair of clamp jigs (such as clamp jigs 40 to be described later), extended in the stator core radial direction, for clamping from both sides in the stator core circumferential direction the end part of the electric conductor to be welded, moving means for allowing the stator core and the clamp jig to move relative to each other in the stator core axis direction, and clamp jig opening and closing means for opening and closing the pair of clamp jigs by moving the pair of clamp jigs, in which the bottom of the clamp jig has a convex part (such as a fin part 42 to be described later) provided extending in the stator core axis direction and inserted between unwelded electric conductors.

According to the present invention, actions and effects similar to those of the invention relating to the clamp jig described above are achieved.

In the stator manufacturing device described above, the convex part is configured to have a flat plate shape extended in the stator core circumferential direction and an end part of the convex part in a direction in which the clamp jig is closed such that the electric conductor is sandwiched has a notch (such as a notch 421 to be described later).

Accordingly, in some cases, the insulating film of the electric conductor is hurt as a result of contact with a side surface of the electric conductor when the stator core and the clamp jig move relative to each other in the stator core axis direction and the convex part is inserted between the electric conductors. However, since the notch is provided, a strong contact of the convex part with the side surface of the electric conductor can be inhibited and the film of the electric conductor being hurt when the convex part is inserted between the electric conductors can be inhibited.

In addition, the convex part of the stator manufacturing device has a length to reach the base section of the electric conductor where the insulating film is provided. Accordingly, insertion of the convex part between the unwelded electric conductors can be facilitated and a wide clearance can be ensured between the electric conductors. Accordingly, electrical insulation can be reliably ensured between the electric conductors that have a large potential difference.

In addition, the present invention provides a method for manufacturing a stator for manufacturing a stator by using the clamp jig described above or the stator manufacturing device described above.

According to the present invention, actions and effects similar to those of the invention relating to the clamp jig described above are achieved.

Effects of the Invention

According to the present invention, a clamp jig for inhibiting an increase in the size of clamping equipment and reducing the load during clamping by clamping after doing preliminary aligning of a segment end part, a stator manufacturing device, and a method for manufacturing a stator can be provided.

BRIEF DESCRIPTION OF THE DRAWINGS

FIG. 4 is a side view illustrating the clamp jig 40 according to an embodiment of the present invention.

FIG. 5 is a diagram illustrating how the stator 20 is manufactured by means of the stator manufacturing device 10 according to an embodiment of the present invention.

FIG. 6 is a diagram illustrating how a stator is manufactured by means of the stator manufacturing device according to an embodiment of the present invention.

PREFERRED MODE FOR CARRYING OUT THE INVENTION

Figure 1:
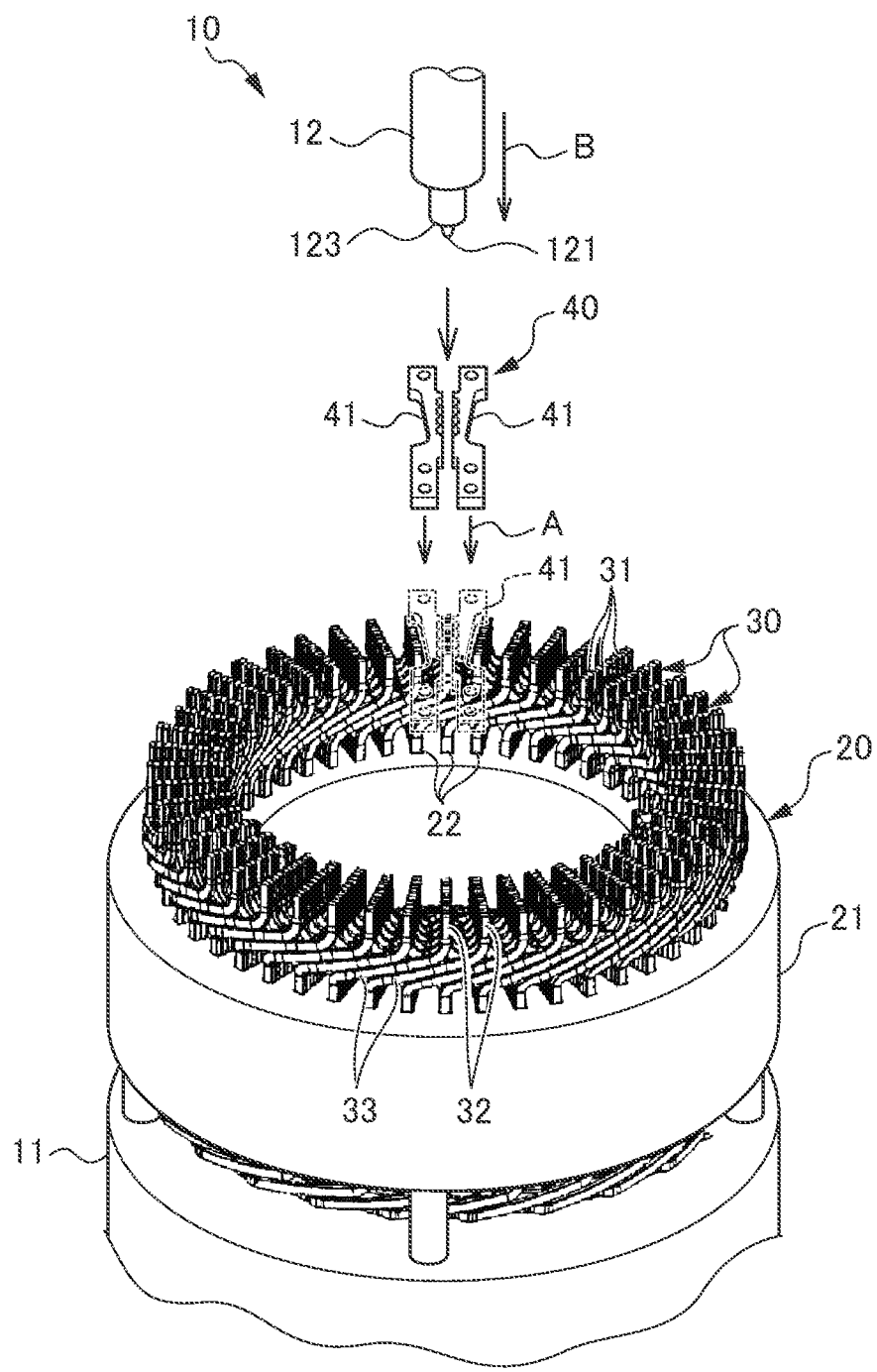
FIG. 1 is a schematic diagram illustrating how a stator 20 is manufactured by means of a welding device 10 as a stator manufacturing device according to an embodiment of the present invention.

Hereinafter, an embodiment of the present invention will be described in detail with reference to accompanying drawings. A clamp jig 40 and a stator 20 that has a segment 30 welded by a welding device 10 as a stator manufacturing device will be described first. FIG. 1 is a schematic diagram illustrating how the stator 20 is manufactured by means of the welding device 10 as the stator manufacturing device according to an embodiment of the present invention.

The welding device 10 is provided with a stator jig 11, a welding torch 12, and the clamp jig 40. The stator jig 11 supports the stator 20 to be rotatable about the axis center of the stator 20. In this configuration, the stator 20 is rotated and the position of an end part 31 of the segment 30 inserted in the stator 20 with respect to the welding torch 12 can be changed by the stator jig 11 rotating.

The welding torch 12 is supported to be movable in the up-down direction and the radial direction of the stator 20. The welding torch 12 is provided with an electrode 121 of TIG welding and a shield gas outlet 123. In the present embodiment, TIG welding is used as a welding method. As described below, in a row of the end parts 31 of one segment 30, eight end parts 31 are welded two by two by TIG welding. Subsequently, the stator 20 is rotated by the stator jig 11 and eight end parts 31 in a row of the end parts 31 of another segment 30 adjacent to the row of the end parts 31 of the segment 30 are welded two by two by TIG welding. By this being repeated, in this configuration, the end parts 31 of a plurality of the segments 30 are electrically connected two by two.

The stator 20 is provided with a stator core 21, a plurality of slots 22, and the plurality of segments 30 as electric conductors. The stator core 21 has a cylindrical shape, and the plurality of slots 22 are formed in the stator core 21. Through holes penetrating the stator core 21 in the axis direction of the stator core 21 constitute the plurality of slots 22, and the plurality of slots 22 are formed radially about the axis center of the stator core 21 and over the entire circumferential direction.

The segment 30 has a conductor 32 to be energized and an insulating film 33 insulating the surroundings by covering the conductor 32. A rectangular wire rod made of copper constitutes the conductor 32. A soft insulating material constitutes the insulating film 33. The insulating film 33 is peeled off and the rectangular wire rod is exposed at the end part 31 of the segment 31.

The plurality of segments 30 are respectively inserted in the plurality of slots 22 formed in the stator 20. By the segment 30 being put into a state where the segment 30 is inserted in the stator core 21, the end parts 31 of the plurality of segments 30 are arranged in a row, eight by eight, in the radial direction of the stator core 21. A plurality of the rows of the end parts 31 of the segments 30 arranged eight by eight are arranged radially about the axis center of the stator core 21.

Figure 2:
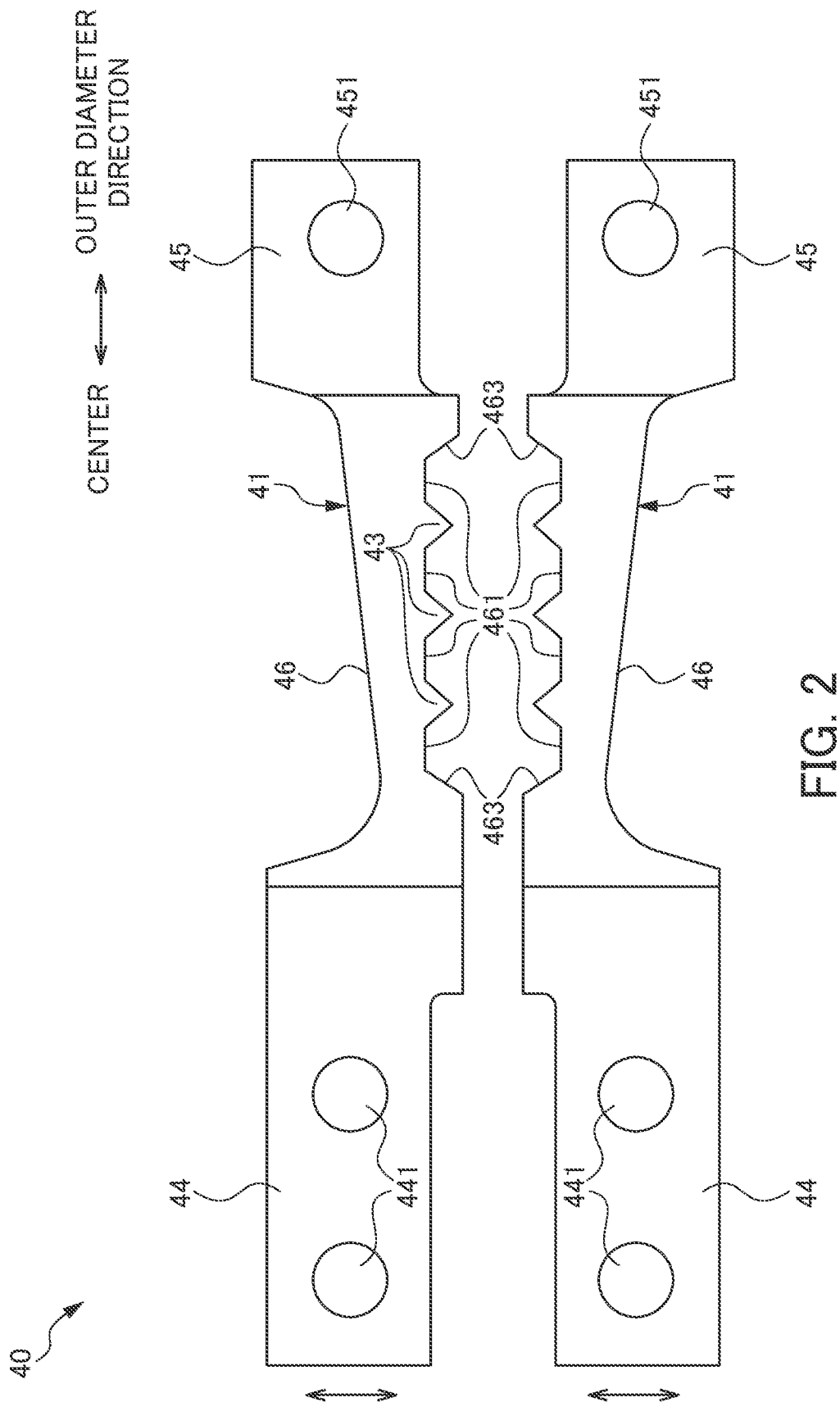
FIG. 2 is a plan view illustrating a clamp jig 40 according to an embodiment of the present invention.
Figure 3:
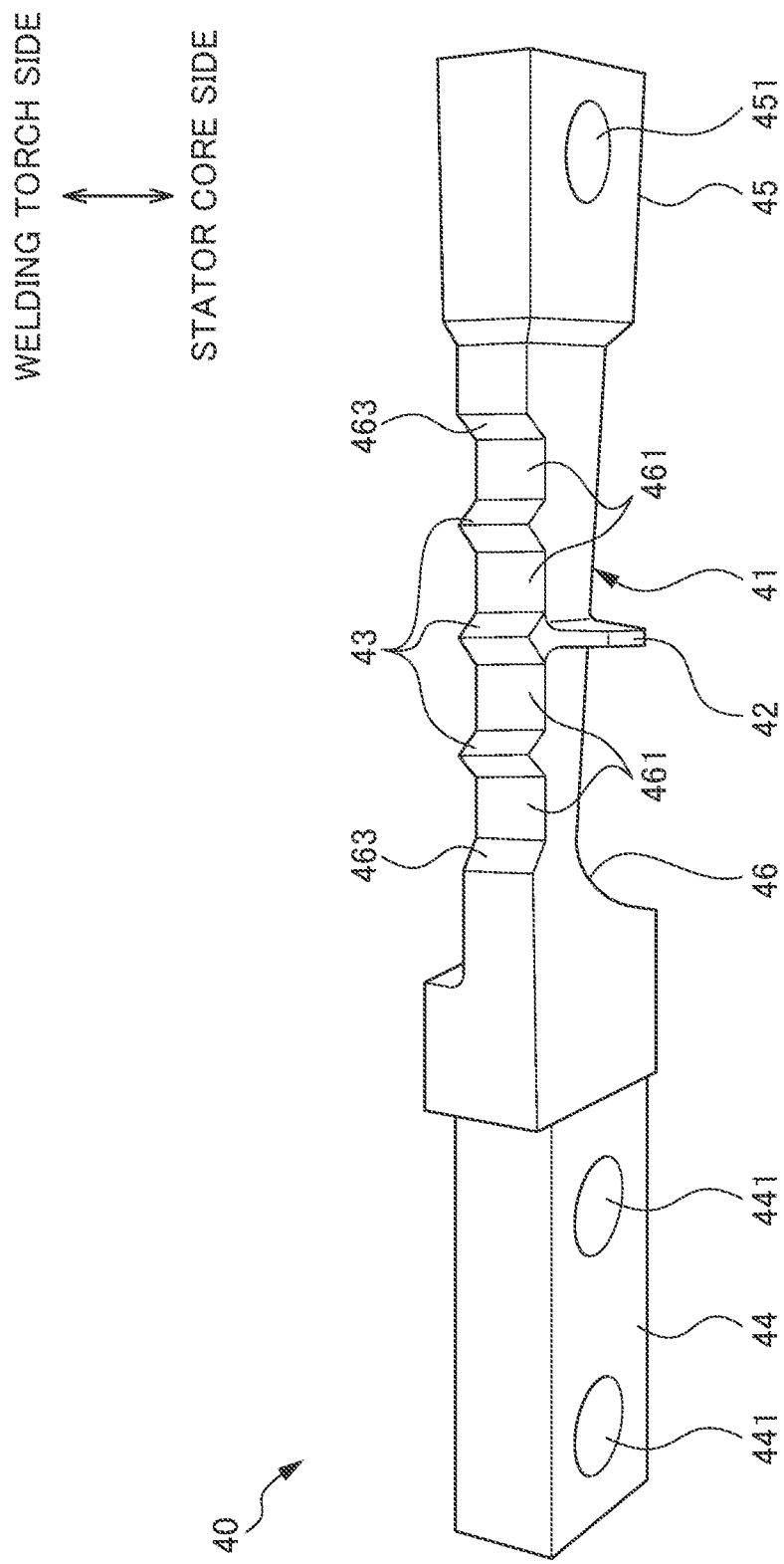
FIG. 3 is a perspective view illustrating the clamp jig 40 according to an embodiment of the present invention.

The clamp jig 40 will be described below. A pair of clamp bodies 41 constituting the clamp jig 40 has a bilaterally symmetrical shape, and thus only one of the clamp bodies 41 will be described below and description of the other will be omitted. FIG. 2 is a plan view illustrating the clamp jig 40 according to an embodiment of the present invention. FIG. 3 is a perspective view illustrating the clamp jig 40 according to an embodiment of the present invention. FIG. 4 is a side view illustrating the clamp jig 40 according to an embodiment of the present invention.

The clamp jig 40 has the clamp body 41, and the clamp body 41 has a center side support part 44, an outer diameter side support part 45, and an intermediate sandwiched part 46. The center side support part 44, the intermediate sandwiched part 46, and the outer diameter side support part 45 have a positional relationship to be arranged in this order, are made of copper and connected by integral molding, and are used in a positional relationship in which the center side support part 44, the intermediate sandwiched part 46, and the outer diameter side support part 45 are extended in the radial direction of the stator core 21. The clamp jig 40 is supported by a moving device part (not illustrated) as moving means for allowing the clamp jig 40 to move relative to the stator core 21 in the axis direction of the stator core 21 (the direction indicated by the arrow A in FIG. 1 and the opposite direction thereto).

The center side support part 44 has a substantially rectangular parallelepiped shape, and two through holes 441 are formed along the longitudinal direction of the center side support part 44. The center side support part 44 is fixed to the moving device part (not illustrated) of the welding device 10 supporting the clamp jig 40 by a bolt (not illustrated) passing through each of the two through holes 441. The moving device part of the welding device 10 is provided with a clamp jig opening and closing device part (not illustrated) as clamp jig opening and closing means. The moving device part (not illustrated) is configured to open and close a pair of the clamp jigs 40 by causing the pair of clamp jigs 40 to be separated from each other or approach each other in the circumferential direction of the stator core 21 (substantially up-down direction in FIG. 5(a)) and for the end part 31 of the segment 30 inserted in the stator 20 to be clamped (sandwiched) by the clamp jigs 40 as a result.

The outer diameter side support part 45 has a substantially rectangular parallelepiped shape, and a through hole 451 is formed at a part close to the end part on the side that is opposite to the side connected to the intermediate sandwiched part 46. The outer diameter side support part 45 is fixed to the moving device part (not illustrated) of the welding device 10 supporting the clamp jig 40 by a bolt (not illustrated) passing through the through hole 451.

Figure 5E:
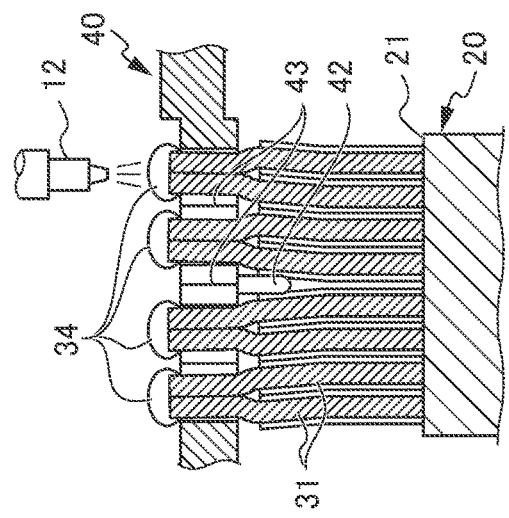
FIG. 5(e) is a sectional view illustrating how the segment end part 31 is welded.
Figure 5C:
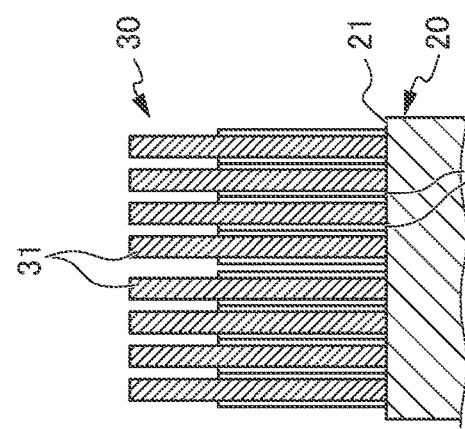
FIG. 5(c) is a sectional view taken along line c-c of FIG. 5(a).
Figure 5D:
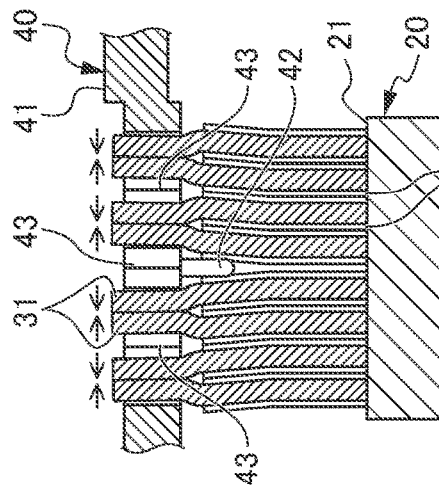
FIG. 5(d) is a sectional view taken along line d-d of FIG. 5(b).
Figure 5A:
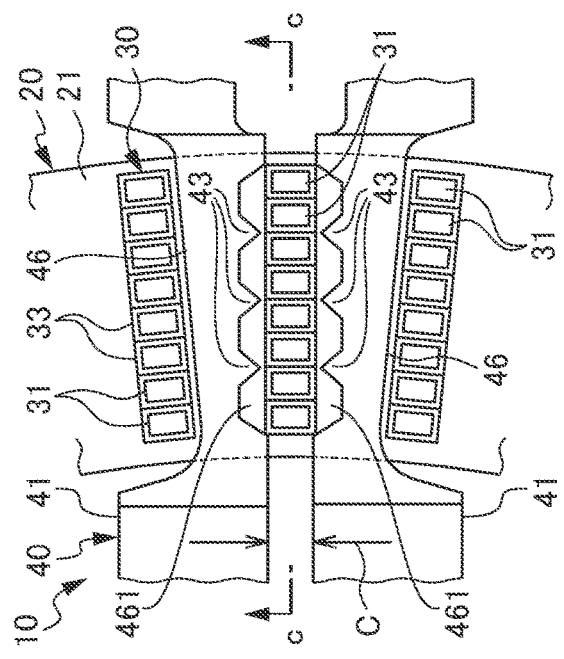
FIG. 5(a) is a plan view illustrating a state where an end part 31 of a segment 30 is yet to be clamped by the clamp jig 40.
Figure 5B:
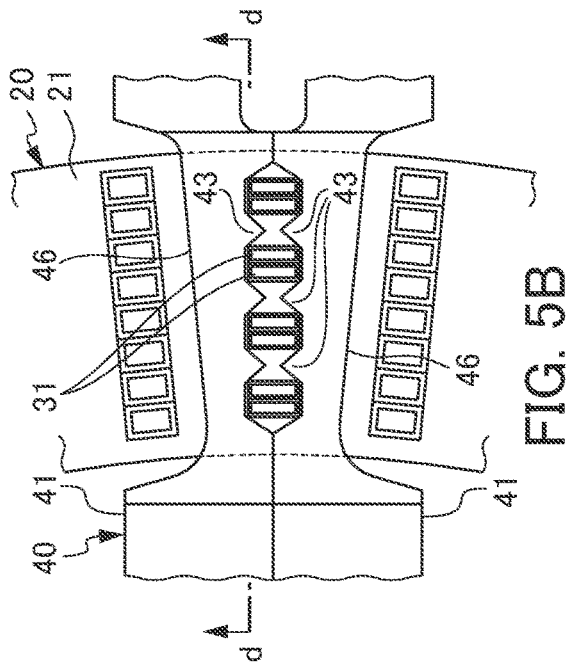
FIG. 5(b) is a plan view illustrating a state where the segment end part 31 is clamped by the clamp jig 40.

As illustrated in FIGS. 5(a) and 5(b), the intermediate sandwiched part 46 clamps the end part 31 of the segment 30 to be welded from both circumferential sides of the stator core (substantially both upper and lower sides in FIG. 5(a)). As illustrated in FIG. 3 and so on, the intermediate sandwiched part 46 has a fin part 42 as a convex part, a guide projection 43, and an end part accommodating recessed part 461.

The fin part 42 has a flat plate shape, and the surface and the back surface of the fin part 42 (the surface of the fin part 42 on the radially inner side of the stator core 21 and the surface of the fin part 42 on the radially outer side of the stator core 21) have a positional relationship to be orthogonal to the longitudinal direction of the clamp body 41 (positional relationship to be extended substantially in parallel to the circumferential direction of the stator 20). As illustrated in FIG. 3, the fin part 42 protrudes and is extended downward, that is, in the axis direction of the stator core 21 from the lower surface of the bottom of the intermediate sandwiched part 46. The fin part 42 has a length to reach base sections 301 (refer to FIG. 6) of the plurality of segments 30 where the rectangular wire rod is covered with the insulating film 33 when the end parts 31 of the plurality of segments 30 are sandwiched by the clamp jig 40.

Figure 6A:
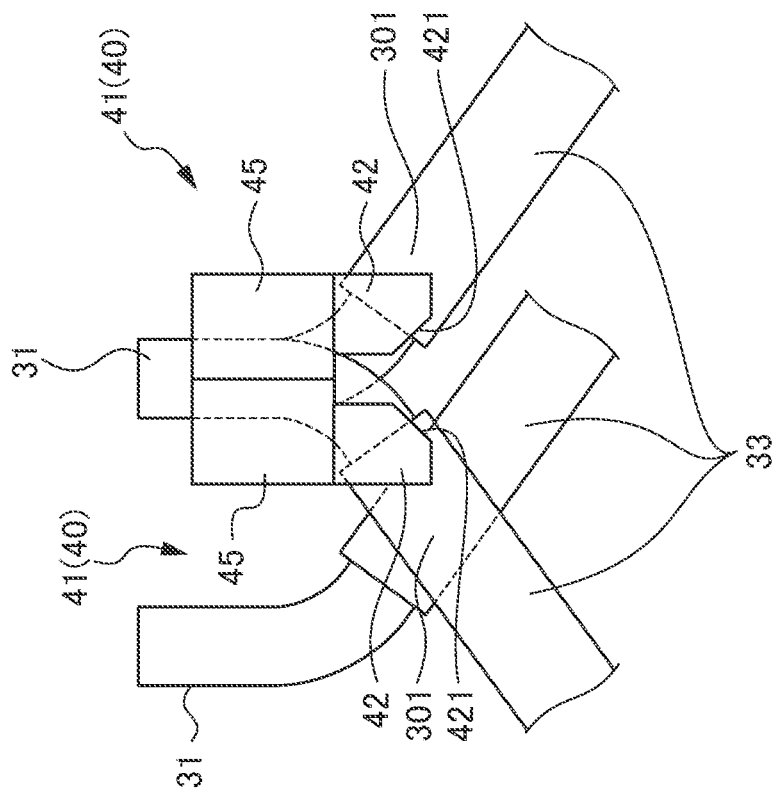
FIG. 6(a) is a diagram illustrating a state where the segment end part 31 is yet to be clamped by the clamp jig 40, which is a view in the radial direction of a stator core 21.

As illustrated in FIG. 6, a notch 421 is formed at the bottom of the fin part 42. The notch 421 is present at the end part of the bottom of each fin part 42 in the direction in which the clamp jig 40 is closed such that the end part 31 of the segment 30 as an electric conductor is sandwiched, that is, the direction in which the fin parts 42 illustrated in FIG. 6(a) approach each other by the pair of clamp jigs 40 sandwiching the end parts 31 of the plurality of segments 30.

The notch 421 is shaped to be notched along the direction in which the segment 30 is extended from the end part 31 of the segment 30 toward the base section 301. In other words, the segments 30 are extended away from each other in the left-right direction of FIG. 6(a), such that hems spread as illustrated in the drawing, toward the base section 301 from the end parts 31 of the segments 30 welded together. The notch 421 is shaped to be diagonally notched along the extension direction. For example, the notch 421 that is illustrated on the left side in FIG. 6(a) is shaped to be notched to be inclined from the upper right toward the lower left. In addition, the notch 421 that is illustrated on the right side in FIG. 6(a) is shaped to be notched to be inclined from the upper left toward the lower right.

As illustrated in FIG. 2 and so on, three guide projections 43 protrude from a side surface of one of the clamp bodies 41 toward a side surface of the other clamp body 41 with the clamp bodies 41 facing each other. The three guide projections 43 have a substantially isosceles triangle shape in the plan view that is illustrated in FIG. 2.

The end part accommodating recessed part 461, which is relatively recessed with respect to the guide projection 43, is formed in the intermediate sandwiched part 46 owing to the presence of the guide projection 43. A total of four end part accommodating recessed parts 461 are formed, side by side in the radial direction of the stator core 21, between each two of the three guide projections 43 that are adjacent to each other and between the guide projections 43 on both sides and end part convex walls 463 by the two guide projections 43. Two end parts 31 of the segment 30 are accommodated in each of the four end part accommodating recessed parts 461 and a total of eight end parts 31 of the segment 30 are clamped by the clamp body 41.

Figure 6B:
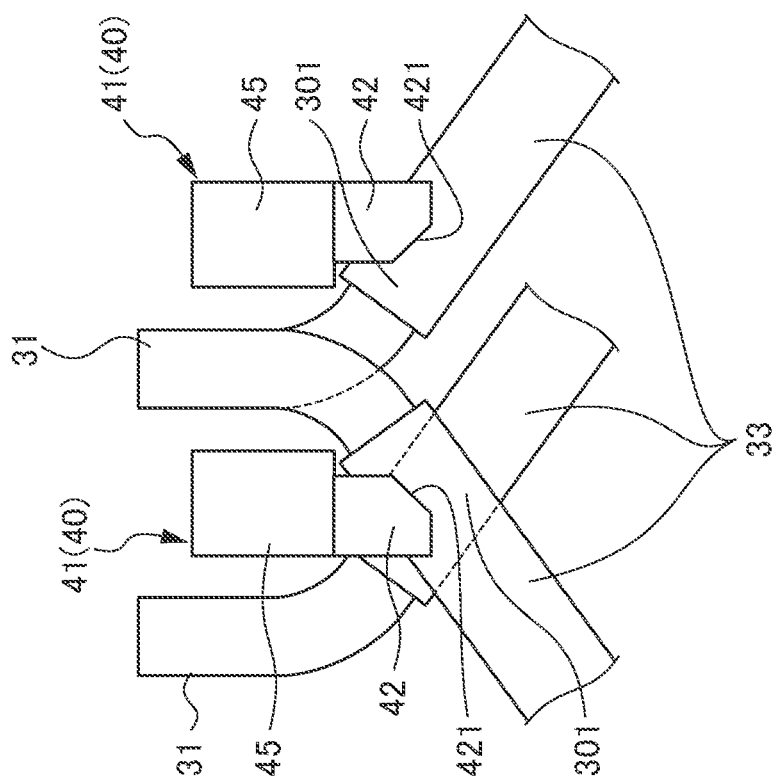
FIG. 6(b) is a diagram illustrating a state where the segment end part 31 is clamped by the clamp jig 40, which is a view in the radial direction of the stator core 21.
Figure 7:
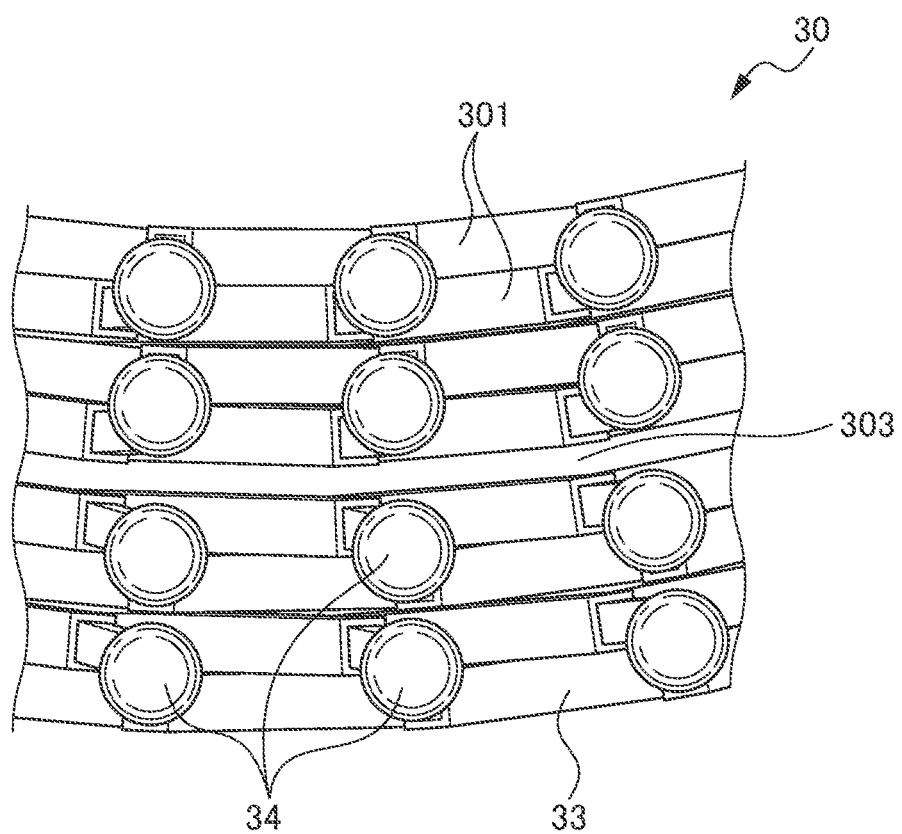
FIG. 7 is a diagram illustrating the segment 30 welded by the stator manufacturing device 10 according to an embodiment of the present invention.

A method for manufacturing a stator by using the welding device 10 that has the clamp jig 40 will be described below. FIG. 5 is a diagram illustrating how the stator 20 is manufactured by means of the stator manufacturing device 10 according to an embodiment of the present invention. FIG. 5(a) is a plan view illustrating a state where the end part 31 of the segment 30 is yet to be clamped by the clamp jig 40. FIG. 5(b) is a plan view illustrating a state where the segment end part 31 is clamped by the clamp jig 40. FIG. 5(c) is a sectional view taken along line c-c of FIG. 5(a). FIG. 5(d) is a sectional view taken along line d-d of FIG. 5(b). FIG. 5(e) is a sectional view illustrating how the segment end part 31 is welded. FIG. 6 is a diagram illustrating how a stator is manufactured by means of the stator manufacturing device according to an embodiment of the present invention. FIG. 6(a) is a diagram illustrating a state where the segment end part 31 is yet to be clamped by the clamp jig 40, which is a view in the radial direction of the stator core 21. FIG. 6(b) is a diagram illustrating a state where the segment end part 31 is clamped by the clamp jig 40, which is a view in the radial direction of the stator core 21. FIG. 7 is a diagram illustrating the segment 30 welded by the stator manufacturing device 10 according to an embodiment of the present invention.

Firstly, the stator 20 is rotated by the stator jig 11 being rotated and a row of the end parts 31 of the segment 30 to be clamped is moved to the vicinity of the clamp jig 40. Then, the clamp jig 40 is moved, by driving of the clamp moving device part, to a position where the intermediate sandwiched part 46 of the clamp jig 40 is capable of clamping the row of the end parts 31 of the segment 30 to be clamped. As illustrated in FIG. 5(a), the clamp bodies 41 are disposed between the row of the end parts 31 of the segment 30 to be clamped and the rows of the end parts 31 of the segments 30 next to the row on both sides among a plurality of the rows of the end parts 31 of the segments 30 formed in the circumferential direction of the stator core 21.

Next, the pair of clamp bodies 41 is allowed to approach each other in the direction indicated by the arrow C, as illustrated in FIG. 5(a), by the clamp jig opening and closing device part (not illustrated) of the welding device 10 being driven. As a result, the fin part 42 enters the position of the base section 301 (refer to FIG. 6) between the four end parts 31 of the segment 30 on the radially inner side and the four end parts 31 of the segment 30 on the radially outer side among the eight end parts 31 of the segment 30 arranged in a row in the radial direction of the stator core 21, that is, between the fourth and fifth ones from the radially inner side of the stator core 21 toward the radially outer side of the stator core 21 among the eight end parts 31 of the segment 30 arranged in a row in the radial direction of the stator core 21 as illustrated in FIG. 5(d). Subsequently, by the clamp bodies 41 being allowed to further approach each other in the direction indicated by the arrow C, preliminary aligning of the end parts 31 of the segment 30 is performed as the fin part 42 pushes the four end parts 31 of the segment 30 on the radially inner side of the stator core 21 inward in the radial direction of the stator core 21 and pushes the four end parts 31 of the segment 30 on the radially outer side of the stator core 21 outward in the radial direction of the stator core 21.

As a result, the four end parts 31 of the segment 30 on the radially inner side of the stator core 21 become easy to enter the two end part accommodating recessed parts 461 on the radially inner side of the stator core 21 two by two. The four end parts 31 of the segment 30 on the radially outer side of the stator core 21 become easy to enter the two end part accommodating recessed parts 461 on the radially outer side of the stator core 21 two by two.

Subsequently, by the clamp bodies 41 being allowed to further approach each other in the direction indicated by the arrow C, the eight end parts 31 of the segment 30 are clamped, two by two, to the clamp bodies 41 in a state where the end parts 31 are accommodated in the end part accommodating recessed parts 461 as illustrated in FIG. 5(b). At this time, the four end parts 31 of the segment 30 on the radially inner side of the stator core 21 are already moved inward in the radial direction of the stator core 21 as a whole and the four end parts 31 of the segment 30 on the radially outer side of the stator core 21 are already moved outward in the radial direction of the stator core 21 as a whole as described above. Accordingly, the end part 31 of the segment 30 is sandwiched by the guide projection 43 of one of the clamp bodies 41 and the guide projection 43 of the other clamp body 41 and partial collapsing of the segment 30 is inhibited.

Next, the torch 12 is moved, in the direction indicated by the arrow B in FIG. 1, relative to the end parts 31 of the segment 30 clamped by the clamp bodies 41 and welding is performed, sequentially and two by two as illustrated in FIG. 5(e), on the four sets of the end parts 31 of the segment 30. As a result, a weld ball 34 is formed at the tip part of the end part 31 of the segment 30 and the end parts 31 of the segment 30 are welded two by two. All of the end parts 31 of the segment 30 are welded two by two by the above-described process being performed on each row of the eight end parts 31 of the segment 30 arranged in the radial direction of the stator core 21. Manufactured as a result is the stator 20 that has the segment 30 which is in a state where the width (separation distance) in the radial direction of the stator core 21 that is ensured for a space 303 between the fourth end part 31 of the segment 30 from the radially inner side of the stator core 21 and the fifth end part 31 of the segment 30 from the radially inner side of the stator core 21 is longer than the width (separation distance) between the other end parts 31 of the segment 30 adjacent to each other in the radial direction of the stator core 21 as illustrated in FIG. 7.

The present embodiment has the following effects. In the present embodiment, the clamp jig 40 has the pair of clamp bodies 41, configured extending in the radial direction of the stator core 21, for clamping from both sides in the circumferential direction of the stator core 21 the end part 31 of the segment 30 as an electric conductor, which is inserted in the stator core 21 and welded, and the fin part 42 as a convex part provided extending in the axis direction of the stator core 21 at the bottom of the clamp body 41, the fin part 42 being inserted between unwelded segments 30.

In addition, in the present embodiment, the stator manufacturing device 10 manufacturing the stator 20 by welding the end part 31 of the segment 30 as an electric conductor inserted in the stator core 21 has the pair of clamp jigs 40 extended in the radial direction of the stator core 21 and clamping the end part 31 of the segment 30 to be welded from both sides in the circumferential direction of the stator core 21, the moving device part as moving means for allowing the stator core 21 and the clamp jig 40 to move relative to each other in the axis direction of the stator core 21, and the clamp jig opening and closing device part as clamp jig opening and closing means for opening and closing the pair of clamp jigs 40 by moving the pair of clamp jigs 40. The bottom of the clamp jig 40 has the fin part 42 as a convex part provided extending in the axis direction of the stator core 21 and inserted between the unwelded segments 30.

As a result, when the clamp jig 40 is disposed next to the segment 30 as an electric conductor, the fin part 42 as a convex part is inserted between the segments 30 before sandwiching by the clamp jig 40. Then, the end part 31 of the segment 30 is pressed in the radial direction of the stator core 21 by the fin part 42, the end part 31 of the segment 30 is moved, and the end part 31 of the segment 30 is preliminarily aligned. In other words, preliminary aligning is performed such that the eight end parts 31 of the segment 30 are separated four by four with the middle position in the direction in which the end parts 31 are arranged serving as a boundary. As a result, a state can be achieved where the end parts 31 of the segment 30 are easily accommodated two by two in the end part accommodating recessed parts 461.

The preliminary aligning is performed in advance before the sandwiching by the clamp jig 40 as described above, and thus the load applied to the clamp jig 40 when the segment 30 is sandwiched by the clamp body 41 and when the clamp jig 40 is moved in a state where the segment 30 is sandwiched by the clamp jig 40 is reduced. In addition, since the fin part 42 as a convex part is integrally attached to the clamp jig 40, a separate preliminary aligning process for preliminarily aligning the end part 31 of the segment 30 does not have to be provided and clamping can be performed with preliminary aligning during a series of clamping operations, and thus equipment costs can be reduced along with the cycle time for welding the end part 31 of the segment 30. In addition, collapsing of the segment 30 attributable to sandwiching by the clamp body 41 of the clamp jig 40 can be inhibited.

In addition, the fin part 42 as a convex part is configured to have a flat plate shape extended in the circumferential direction of the stator core 21. The end part of the fin part 42 in the direction in which the clamp jig 40 is closed such that the segment 30 is sandwiched has the notch 421.

In some cases, the insulating film 33 of the segment 30 is hurt as a result of contact with a side surface of the segment 30 when the stator core 21 and the clamp jig 40 move relative to each other in the axis direction of the stator core 21 and the fin part 42 as a convex part is inserted between the segments 30. However, since the notch 421 is provided, a strong contact of the fin part 42 with the side surface of the segment 30 can be inhibited and the film of the segment 30 being hurt when the fin part 42 is inserted between the segments 30 can be inhibited.

In addition, the fin part 42 as a convex part has a length to reach the base section 301 of the electric conductor where the insulating film 33 is provided. As a result, insertion of the fin part 42 between the unwelded segments 30 can be facilitated and a wide clearance can be ensured between the segments 30. Accordingly, electrical insulation can be reliably ensured between the segments 30 that have a large potential difference.

The present invention is not limited to the above-described embodiment and includes, for example, any modification and improvement allowing the object of the present invention to be achieved. For example, the configuration of each part of the stator manufacturing device is not limited to the configuration of each part of the stator manufacturing device 10 according to the present embodiment. For example, the shape of the convex part is not limited to the shape of the fin part 42 as the convex part according to the present embodiment. In addition, although only one fin part 42 is provided for each clamp body 41 in the above-described embodiment, the fin part 42 is not limited thereto in number.

In addition, although TIG welding is used as a welding method and the welding torch 12 is configured to be provided with the electrode of TIG welding and the shield gas outlet in the present embodiment, the present invention is not limited thereto. For example, MIG welding or the like may be used as an alternative welding method and any other welding method may be used insofar as the end part 31 of the segment 30 can be welded. In addition, the segment 30 may be inserted in an insulating insulator with the insulator inserted in the slot 22.

EXPLANATION OF REFERENCE NUMERALS

10 WELDING DEVICE (STATOR MANUFACTURING DEVICE)
21 STATOR CORE
30 SEGMENT (ELECTRIC CONDUCTOR)
31 END PART
33 INSULATING FILM
40 CLAMP JIG
41 CLAMP BODY
42 FIN PART (CONVEX PART)
301 BASE SECTION

The invention claimed is:

1. A clamp jig comprising:
a pair of clamp bodies, extended in a radial direction of a stator core, configured to clamp from both sides, in a circumferential direction of the stator core, an end part of an electric conductor, which is inserted in the stator core and welded;
a pair of guide projections respectively provided on the pair of clamp bodies, the pair of guide projections accommodating the electric conductor when the pair of clamp bodies clamp the electric conductor; and
a pair of convex parts respectively provided as part of the pair of clamp bodies at a bottom of the pair of clamp bodies facing the stator core, the pair of convex parts extending in an axis direction of the stator core from the bottom, the pair of convex parts being inserted between unwelded electric conductors in the radial direction of the stator core so the unwelded electric conductors are separated by the pair of convex parts in the radial direction of the stator core.

2. A stator manufacturing device configured for manufacturing a stator by welding an end part of an electric conductor inserted in a stator core, the stator manufacturing device comprising:
a pair of clamp jigs, extended in a radial direction of the stator core, for clamping from both sides, in a circumferential direction of the stator core, the end part of the electric conductor to be welded; and
a welding torch for welding the end part of the electric conductor clamped by the pair of clamp jigs,
wherein the pair of clamp jigs are movable relative to the stator core in an axis direction of the stator core, and the pair of clamp jigs are movable to open and close the pair of clamp jigs to respectively clamp and release the end part of the electric conductor, and the pair of clamp jigs comprising:
a pair of guide projections respectively provided on the pair of clamp jigs, the pair of guide projections accommodating the electric conductor when the pair of clamp jigs clamp the electric conductor; and
a pair of convex parts respectively provided as part of the pair of clamp jigs at a bottom of the pair of clamp jigs facing the stator core, the pair of convex parts extending in the axis direction of the stator core from the bottom, the pair of convex parts being inserted between unwelded electric conductors in the radial direction of the stator core so the unwelded electric conductors are separated by the pair of convex parts in the radial direction of the stator core.

3. The stator manufacturing device according to claim 2, wherein the pair of convex parts are each configured to have a flat plate shape extended in the stator core circumferential direction, and
an end part of each of the pair of convex parts in a direction in which the pair of clamp jigs is closed such that the electric conductor is sandwiched has a notch.

4. The stator manufacturing device according to claim 2, wherein the pair of convex parts each have a length to reach a base section of the electric conductor where an insulating film is provided.

5. The clamp jig according to claim 1, wherein the pair of convex parts are respectively integrally attached to the pair of clamp bodies.

6. The stator manufacturing device according to claim 2, wherein the pair of convex parts are respectively integrally attached to the respective pair of clamp jigs.

* * * * *